United States Patent
Marcus (10) Patent No.: US 10,339,216 B2
(45) Date of Patent: Jul. 2, 2019

(54) METHOD AND APPARATUS FOR SELECTING AMONG COMPETING MODELS IN A TOOL FOR BUILDING NATURAL LANGUAGE UNDERSTANDING MODELS

(71) Applicant: Nuance Communications, Inc., Burlington, MA (US)

(72) Inventor: Jeffrey N. Marcus, Newton, MA (US)

(73) Assignee: Nuance Communications, Inc., Burlington, MA (US)

( * ) Notice: Subject to any disclaimer, the term of this patent is extended or adjusted under 35 U.S.C. 154(b) by 188 days.

(21) Appl. No.: 13/952,213

(22) Filed: Jul. 26, 2013

(65) Prior Publication Data

US 2015/0032442 A1    Jan. 29, 2015

(51) Int. Cl.
    *G06F 17/27* (2006.01)

(52) U.S. Cl.
    CPC .................. *G06F 17/271* (2013.01)

(58) Field of Classification Search
    None
    See application file for complete search history.

(56) References Cited

U.S. PATENT DOCUMENTS

| | | | | |
|---|---|---|---|---|
| 6,292,767 B1* | 9/2001 | Jackson | ........... | G06F 17/279 704/1 |
| 6,631,346 B1* | 10/2003 | Karaorman et al. | ........... | 704/9 |
| 8,639,508 B2* | 1/2014 | Zhao et al. | ........... | 704/249 |
| 9,330,659 B2* | 5/2016 | Ju | ........... | G10L 15/063 |
| 2003/0212544 A1* | 11/2003 | Acero et al. | ........... | 704/9 |
| 2003/0216905 A1* | 11/2003 | Chelba | ........... | G06F 17/271 704/9 |
| 2005/0114758 A1* | 5/2005 | Lang | ........... | G06F 17/30038 715/230 |
| 2005/0119892 A1* | 6/2005 | Agapi et al. | ........... | 704/270 |
| 2007/0055529 A1* | 3/2007 | Kanevsky et al. | ........... | 704/275 |

(Continued)

OTHER PUBLICATIONS

Nuance Call Steering Portal 1.1; "Administering Call Steering Portal", Nuance Communications, Inc., Nov. 25, 2013.

(Continued)

*Primary Examiner* — Michael N Opsasnick
(74) *Attorney, Agent, or Firm* — Hamilton, Brook, Smith & Reynolds, P.C.

(57) ABSTRACT

Selecting a grammar for use in a machine question-answering system, such as a Natural Language Understanding System, can be difficult for non-experts in such grammars. A tool, according to an example embodiment, can compare annotations of sample sentences, performed correctly by a human, the annotations having intents and mentions, against annotations performed by multiple grammars. Each grammar can be scored, and the system can select the best scored grammar for the user. In one embodiment, a method of selecting a grammar includes comparing manually-generated annotations against machine-generated annotations as a function of a given grammar among multiple grammars. The method can further include applying scores to the machine-generated annotations that are a function of weightings of the intents and mentions. The method can additionally include recommending whether to employ the given grammar based on the scores.

14 Claims, 6 Drawing Sheets

(56) References Cited

U.S. PATENT DOCUMENTS

| | | | |
|---|---|---|---|
| 2007/0106497 A1* | 5/2007 | Ramsey | G06F 17/278 704/9 |
| 2007/0124263 A1* | 5/2007 | Katariya | G06F 17/30663 706/14 |
| 2008/0249762 A1* | 10/2008 | Wang et al. | 704/9 |
| 2009/0112835 A1* | 4/2009 | Elder | F16K 15/16 |
| 2010/0023319 A1* | 1/2010 | Bikel et al. | 704/9 |
| 2010/0268536 A1* | 10/2010 | Suendermann | G10L 15/063 704/243 |
| 2010/0274552 A1* | 10/2010 | Gao | G06F 17/2854 704/2 |
| 2011/0179032 A1* | 7/2011 | Ceusters | G06F 17/2775 707/737 |
| 2013/0138429 A1 | 5/2013 | Shen et al. | |
| 2013/0179766 A1* | 7/2013 | Madnani | G06F 17/241 715/230 |
| 2013/0204626 A1 | 8/2013 | Marcus et al. | |
| 2013/0246098 A1* | 9/2013 | Habboush | G06Q 10/10 705/3 |
| 2013/0346409 A1* | 12/2013 | Welinder | G06F 17/30598 707/737 |
| 2014/0278355 A1* | 9/2014 | Sarikaya | G06F 17/2785 704/9 |
| 2014/0278448 A1* | 9/2014 | Sadeghi | G06Q 50/22 705/2 |
| 2014/0337814 A1* | 11/2014 | Kalns | G06F 8/00 717/100 |
| 2014/0379326 A1* | 12/2014 | Sarikaya | G10L 15/18 704/9 |
| 2015/0012558 A1* | 1/2015 | Heymans et al. | 707/765 |
| 2015/0071556 A1* | 3/2015 | Simske | G06K 9/6227 382/218 |

OTHER PUBLICATIONS

Nuance Call Steering Runtime App 1.1, "Using Call Steering Runtime App" Nuance Communications, Inc., Nov. 25, 2013.
Nuance Call Steering Portal 1.1; "Using Call Steering Portal", Nuance Communications, Inc., Nov. 25, 2013.
U.S. Appl. No. 13/246,801, filed Sep. 27, 2011 entitled "Call Steering Data Tagging Interface with Automatic Semantic Clustering"—Tremblay, et al.

* cited by examiner

| | 302 EXPECTED ANNOTATION TYPE | 304 MANUAL ANNOTATION | 306 MACHINE-GENERATED ANNOTATION | 308 SCORE |
|---|---|---|---|---|
| 310 | INTENT | TICKET | TICKET | 0.5 |
| 312 | FROM CITY | MONTREAL | (DELETION) | 0.1 |
| 314 | TO-CITY | BOSTON | BOSTON | 0.3 |

| | 332 EXPECTED ANNOTATION TYPE | 334 MANUAL ANNOTATION | 336 MACHINE-GENERATED ANNOTATION | 338 SCORE |
|---|---|---|---|---|
| 340 | INTENT | TICKET | TICKET | 0.5 |
| 342 | FROM CITY | MONTREAL | MONTREAL | 0.3 |
| 344 | TO-CITY | BOSTON | BOISE | 0.0 |

| | 362 EXPECTED ANNOTATION TYPE | 364 MANUAL ANNOTATION | 366 MACHINE-GENERATED ANNOTATION | 368 SCORE |
|---|---|---|---|---|
| 370 | INTENT | TICKET | COOKING | 0.0 |
| 372 | FROM CITY | MONTREAL | MONTREAL | 0.3 |
| 374 | TO-CITY | BOSTON | BOSTON | 0.3 |

METHOD AND APPARATUS FOR SELECTING AMONG COMPETING MODELS IN A TOOL FOR BUILDING NATURAL LANGUAGE UNDERSTANDING MODELS

RELATED APPLICATION

This Application is related to "Initializing A Workspace For Building A Natural Language Understanding System" by Jeffrey N. Marcus, attorney docket number 4765.1033-000, filed on the same day as this Application to a common assignee. The foregoing application is hereby incorporated by reference in its entirety.

BACKGROUND

A system can provide non-expert designers an environment for building models (e.g. rules, classifiers, etc.) to perform Natural Language Understanding (NLU) processing. The system can build a project that includes a "concept ontology," which describes the concepts that the NLU system needs to understand, such as "ticketing" or "directions." These concepts are considered "intents," which are the user's goal for the machine interaction. Typically, such a project is built by the user examining statistics of grammars and based on manual analysis, deciding which intents and mentions best fit the project.

SUMMARY

Definitions:

Intent—An end user's basic goal for a machine interaction. The intent label is chosen from a finite set, by a human annotator, that best matches this goal. For example, in a technical support application, an input of "my printer is not working, I need help" might be labeled with an intent of "Printer Problem."

Out-of-domain intent—A caller's intent that does not match any of the available intents in the finite set.

Mention—a piece of information the natural language application uses to complete the action indicated by the intent. For example, in the sentence "I want to travel to Phoenix May 28", the intent can be "Flight" and mentions can be "Date=May 28" and "Destination=Phoenix."

Sentence Annotation—a set of intent and mention labels determined by a human annotator for a sentence.

Test set—A set of sentences along with their annotations used to evaluate competing models.

Semantic confidence threshold—a designer-set parameter indicating a minimum score for the application to accept a given sentence. In the application, each sentence spoken by the end user is assigned a semantic confidence score. Confidences above the threshold are accepted (e.g., processed by the application by offering to reserve a flight for the city and date requested) or rejected, with the user typically being informed that the system did not understand him and optionally being asked to repeat the sentence.

The term "stub grammar" refers to a subset of a grammar, where a "grammar" is understood in the art to mean a model that correlates an input of a user to a response to a user.

In one embodiment, the system of the present invention can additionally include intents and mentions in its concept ontology. The sentence annotations having both intents and mentions allows the system to provide more accurate grammar recommendations than using intents or mentions alone.

Sentences entered into the system by speech or by typing can be annotated within the tool, where a process of annotating decomposes a sentence into its component concepts. For example, annotations can indicate that in "January 24 at 2PM." "January 24" is a date and "2PM" is a time. The system automatically generates a model based on the data.

The system typically repeats this process by correcting annotations, adding more data, and generating new models. Also, the system can set configuration parameters, such as confidence thresholds. Thus, the system typically creates several versions. The NLU designer wants to use the "best" model in his application. However, choosing the "best" model is a complex problem even for an expert and difficult for a non-expert. In one embodiment, the present invention includes a system and corresponding method for ranking models against each other to provide a designer a reasonable choice of models and giving the designer an indication of the overall effectiveness of the resultant model.

The designer can adjust the system's parameters in some embodiments to optimize usability, such as success rate and/or time spent completing a task.

In one embodiment, a method of selecting a grammar from among multiple grammars includes comparing manually-generated annotations, including intents and mentions, corresponding to a set of sentences against machine-generated annotations. The comparing can be a function of a given grammar among multiple grammars. The machine-generated annotations also include intents and mentions corresponding to the set of sentences. The method can further include applying scores to the machine-generated annotations. The scores can be a function of weightings of the intents and mentions. The method can additionally include recommending whether to employ the given grammar based on the scores.

Applying the scores to the machine-generated annotations can include applying a respective intra-sentence score to each of the intents and mentions of the machine-generated annotations based on the comparison of the manually-generated annotations and the machine-generated annotations. Applying the scores to the machine-generated annotations can further include applying an inter-sentence score to the grammar based on the respective intra-sentence scores of each of the intents and mentions of the machine-generated annotations of the grammar. An intra-sentence score can be a score applied to an annotation within the sentence, such as an intent or mention. An intra-sentence score can be a score applied to a sentence as a whole, for example, based on intra-sentence scores applied to the annotations within the sentence.

The method can further include parsing, by the machine, each of the set of sentences to generate the machine-generated annotations.

The method can additionally include adjusting weightings of intents and mentions by performing a statistical regression model of the weightings to optimize a measurement of the end user's experience. An example of a measurement of the end user's experience is the probability of successfully completing a task penalized by how long task completion takes.

Applying the scores to the machine-generated annotations can further include applying multiple scores, where each of the scores is based on a grammar employing a respective confidence threshold. Applying the scores to the machine-generated annotations can further include averaging the plurality of scores over a range of respective confidence thresholds.

In one embodiment, a system for selecting a grammar from among multiple grammars can include a comparison module configured to compare manually-generated annotations including a set of sentences against machine-generated annotations. The comparing can be a function of a given grammar among multiple grammars. The machine-generated annotations can include intents and mentions corresponding to the set of sentences. The system further includes a scoring module configured to apply scores to the machine-generated annotation. The scores can be a function of weightings of the intents and mentions. The system further includes a recommendation module configured to recommend whether to employ the grammar based on the scores.

In one embodiment, a non-transitory computer-readable medium is configured to store instructions for selecting a grammar from among multiple grammars. The instructions, when loaded and executed by a processor, can cause the processor to compare manually-generated annotations including intents and mentions corresponding to a set of sentences to machine-generated annotations. The scores can be a function of a given grammar among multiple grammars. The machine-generated annotations can include intents and mentions corresponding to the set of sentences. The instructions can further cause the processor to apply scores to the machine-generated annotations. The scores can be a function of weightings of the intents and mentions. The instructions can further recommend whether to employ the given grammar based on the scores.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
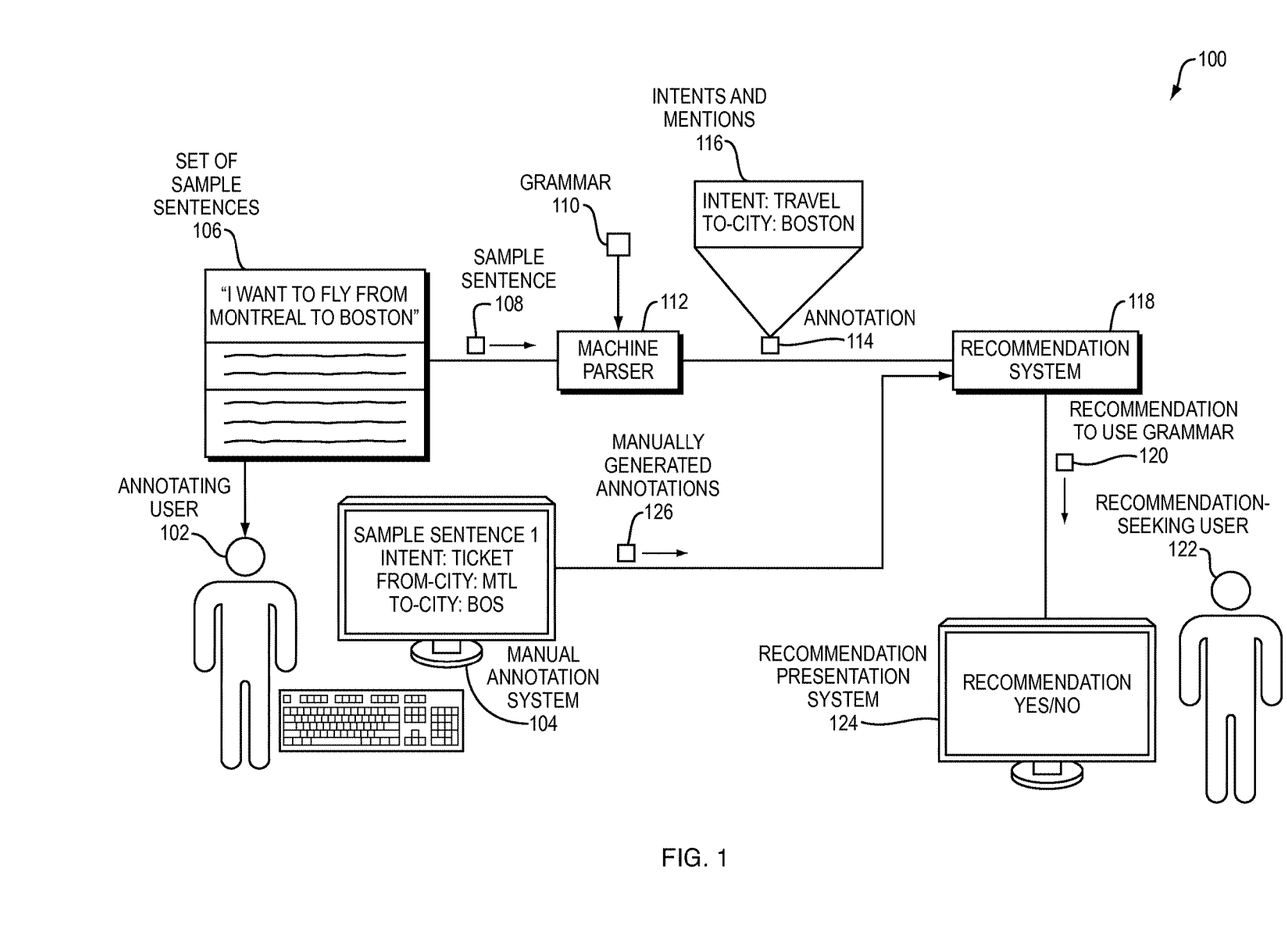
FIG. 1 is a block diagram illustrating an example embodiment of the present invention.

FIG. 1 is a block diagram 100 illustrating an example embodiment of the present invention. An annotating user 102 annotates a set of sample sentences 106 on a manual annotation system 104. The manual annotation system 104 can be a computer or other user device. The annotating user 102 annotates the set of sample sentences 106 by identifying intents and mentions in the sample sentences. An intent is the basic goal of the interaction of the sample sentence. A mention is a piece of information needed to complete the action indicated by the intent. In the example embodiment illustrated by FIG. 1, an example sample sentence 108 states "I want to fly from Montreal to Boston." The annotating user 102 identifies the intent of the sample sentence 108 as "buy ticket." The annotating user 102 further identifies mentions in the sample sentence 108 of a "from city" being Montreal and a "to city" being Boston. The annotating user 102 enters these intents and mentions into the manual annotation system 104 to be associated with the sample sentence 108. The annotating user 102 can continue to annotate other sentences of the set of sample sentences 106.

As the annotating user 102 annotates more sentences on the manual annotation system 104, the set of sample sentences 106 can be checked against these additional manually annotated sentences. The manual annotation system 104 then sends manually-generated annotations 126 to a recommendation system 118. The sample sentence 108 and set of sample sentences 106 can be entered via text entry, speech-to-text or other speech/voice recognition technology, or other method.

A machine parser 112 also receives the sample sentence 108 of the set of sample sentences 106. The machine parser 112 also receives a grammar 110. The machine parser 112, based on the grammar 110, annotates the sample sentence 108. The machine parser 112 generates an annotation 114 that includes intents and mentions 116. In this example, the machine parser 112, based on the grammar 110, generates an annotation 114 that includes intents and mentions 116 indicating an intent of travel and a "to city" of Boston but without a "from city" of Montreal. Such an omission of the "from city," or any other mention or intent, is considered a deletion. The annotation 114 is therefore incomplete and indicates that the grammar 110 is not ideal for the particular application of the set of sample sentences 106.

The recommendation system 118 receives the annotation 114 and compares the annotation 114 to the manually-generated annotations 126 for the sample sentence 108. Based on the comparison, the recommendation system 118 issues a recommendation whether to use the grammar 120. A recommendation presentation system 124 receives the recommendation 120 and delivers the recommendation to a recommendation seeking user 122. The recommendation presentation system 124 can be either the same machine as or a separate machine from the manual annotation system 104. The recommendation seeking user 122 can therefore determine whether to employ the particular grammar 110 or to use a different grammar.

Figure 2:
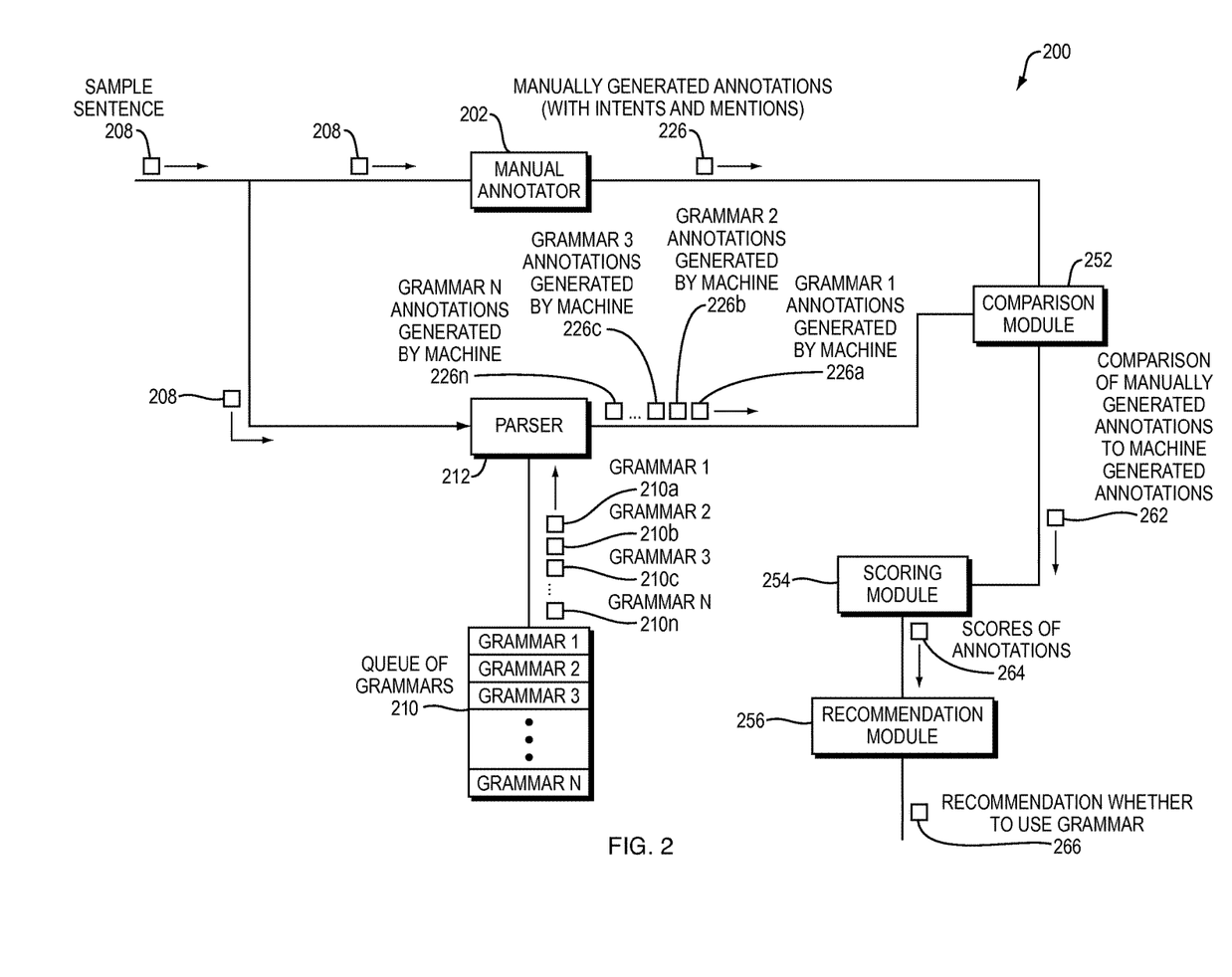
FIG. 2 is a block diagram illustrating an example embodiment of the present invention.

FIG. 2 is a block diagram 200 illustrating an example embodiment of the present invention. A sample sentence 208 is forwarded to a manual annotator 202 and a parser 212. The manual annotator 202 can be an annotating user 102 as described in FIG. 1. The manual annotator 202 generates manually-generated annotations 226 that include intents and mentions. The manual annotator 202 sends the manually-generated annotations 226 to a comparison module 252.

The parser 212 receives the sample sentence 208 and also receives grammars 210a-n of a queue of grammars 210. For each grammar 210a-n of the queue of grammars 210, the parser 212 generates annotations 226a-n. Each of these annotations corresponds to a particular grammar 210a-n. The parser 212 sends each of the annotations 226a-n to the comparison module 252.

The comparison module 252, for each of the grammars 210a-n, generates a comparison of manually-generated annotations to the machine-generated annotations 262 and forwards the comparison 262 to a scoring module 254. The scoring module 254 generates scores of the annotations 264 and sends the scores 264 to a recommendation module 256. The recommendation module generates a recommendation 266 whether to add the grammar to a candidate grammar list based on the scores 264. The candidate grammar list is later presented to the user, who then can select one grammar for use in the NLU project.

Figure 3A:
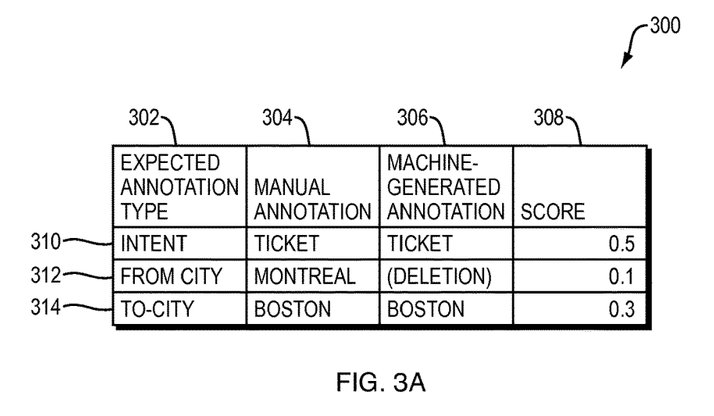
FIG. 3A is a table illustrating an example embodiment of comparing a manual annotation to a machine-generated annotation and generating a score thereof.

FIG. 3A is a block diagram 300 illustrating an example embodiment of comparing a manual annotation 304 to a machine-generated annotation 306 and generating a score 308 thereof. The table 300 indicates an expected annotation type 302 for each expected intent and mention of the manual annotation 304 and machine-generated annotation 306. In this example, the expected annotation type is an intent 310, a "from city" 312, and a "to city" 314. The manual annotation 304 has an intent 310 of "buy ticket," a mention of "from city" 312 of Montreal, and a mention of "to city" 314 of Boston. The manual annotation 304 is the correct annotation interpretation of the sample sentence. The machine-generated annotation 306, in this example for this sample sentence, has an intent 310 of "buy ticket," a mention of "from city" 312 being a deletion, where the grammar did not detect the from city, and a mention of "to city" 314 of Boston. In comparing the manual annotation 304 and machine-generated annotation 306, computing the correct intent is given a score of 0.5, deleting mention of "from city" 312 has a score of 0.1 and correctly detecting the mention of "to city" 314 has a score 308 of 0.3. The scores described above can be weighted either by rules indicating scores for matches, non-matches, deletions, or etc., or by a statistical regression method.

Figure 3B:
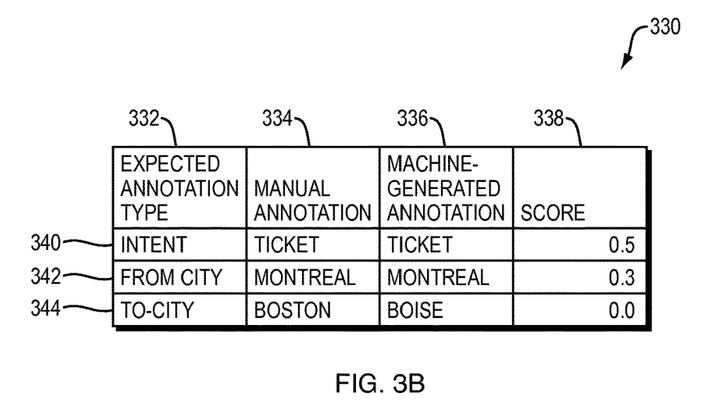
FIG. 3B is a table illustrating an example embodiment of a manual annotation compared to a machine-generated annotation and generating a score thereof.

FIG. 3B is a table 330 illustrating an example embodiment of a manual annotation 334 compared to a machine-generated annotation 336 and generating a score 338 thereof. In comparing the manual annotation 334 to the machine-generated annotation 336, computing the correct intent is given a score of 0.5, correctly detecting the "from city" 342 of Montreal is given a score of 0.3, and incorrectly detecting the "to city" of Boston as Boise is given a score of 0.0.

Figure 3C:
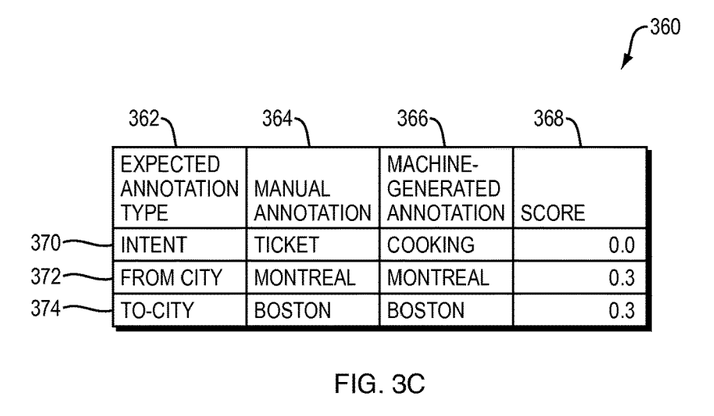
FIG. 3C is a table illustrating an example embodiment of a manual annotation compared to a machine-generated annotation and generating a score therein.

FIG. 3C is a table 360 illustrating an example embodiment of a manual annotation 364 compared to a machine-generated annotation 366 and generating a score 368 therein. In comparing the manual annotation 364 to the machine-generated annotation 366, computing the incorrect intent of "cooking" is given a score of 0.0, while correctly detecting the "from city" 372 as Montreal is given a score of 0.3 and correctly detecting the "to city" 374 as Boston is also given a score of 0.3.

Figure 4:
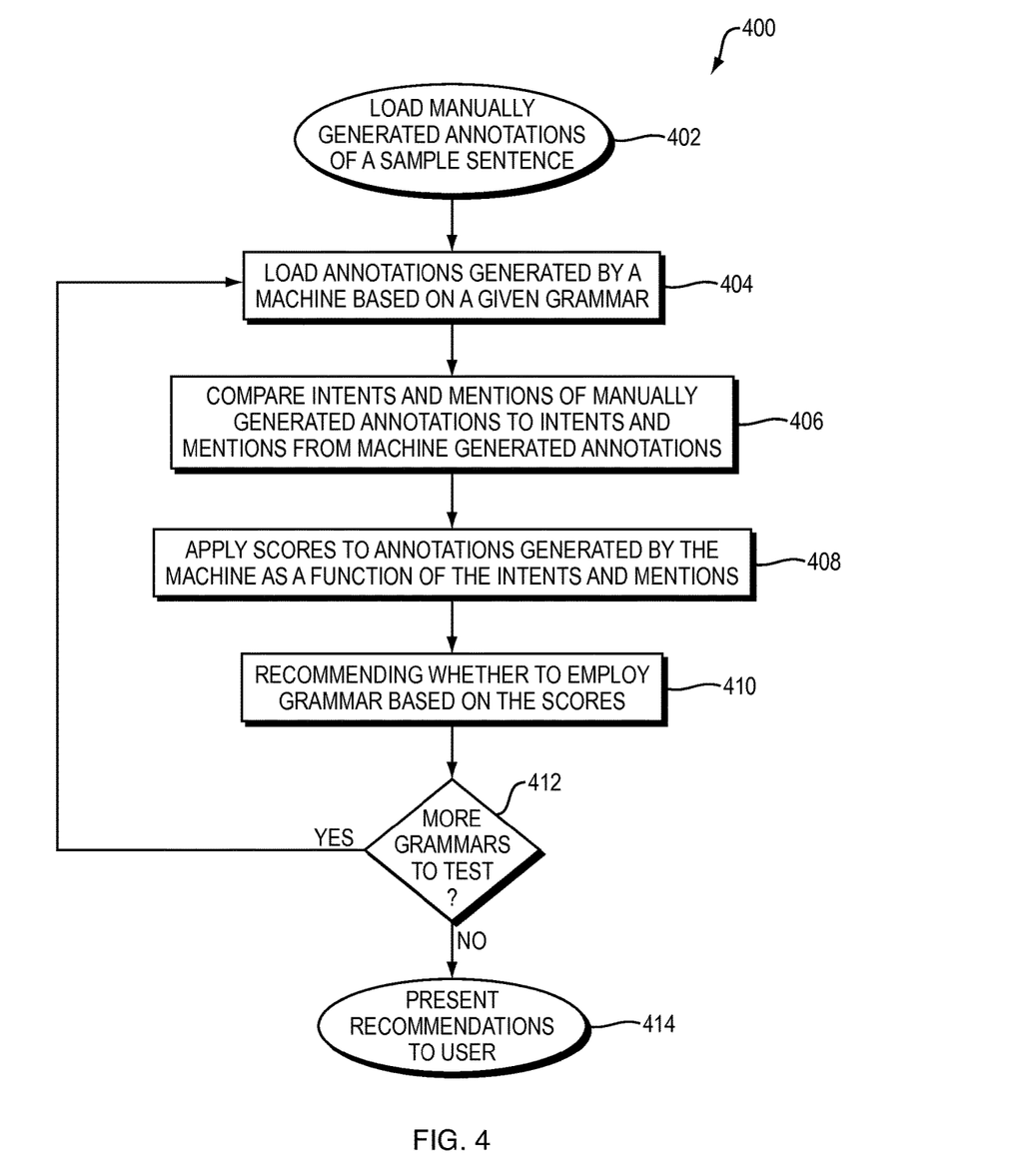
FIG. 4 is a flow diagram illustrating an example embodiment of the present invention.

FIG. 4 is a flow diagram 400 illustrating an example embodiment of the present invention. The method begins by first loading manually-generated annotations of a sample sentence (402). The process then loads machine-generated annotations based on a given grammar (404). Then, the process compares intents and mentions of manually-generated annotations to intents and mentions from machine-generated annotations (406). Then the system applies scores to machine-generated annotations as a function of the intents and mentions (408). Then the system determines whether to add the given grammar to a list of grammars to recommend to the user. (410) The determination is based on the score assigned to the given grammar. The system then determines whether there are more grammars to test (412). If more grammars are available, the system load the machine-generated annotations based on the loaded given grammar (404). Otherwise, the system presents the recommendations to the user (414). Upon presentation to the user, user can select one grammar to use for the NLU project.

Figure 5:
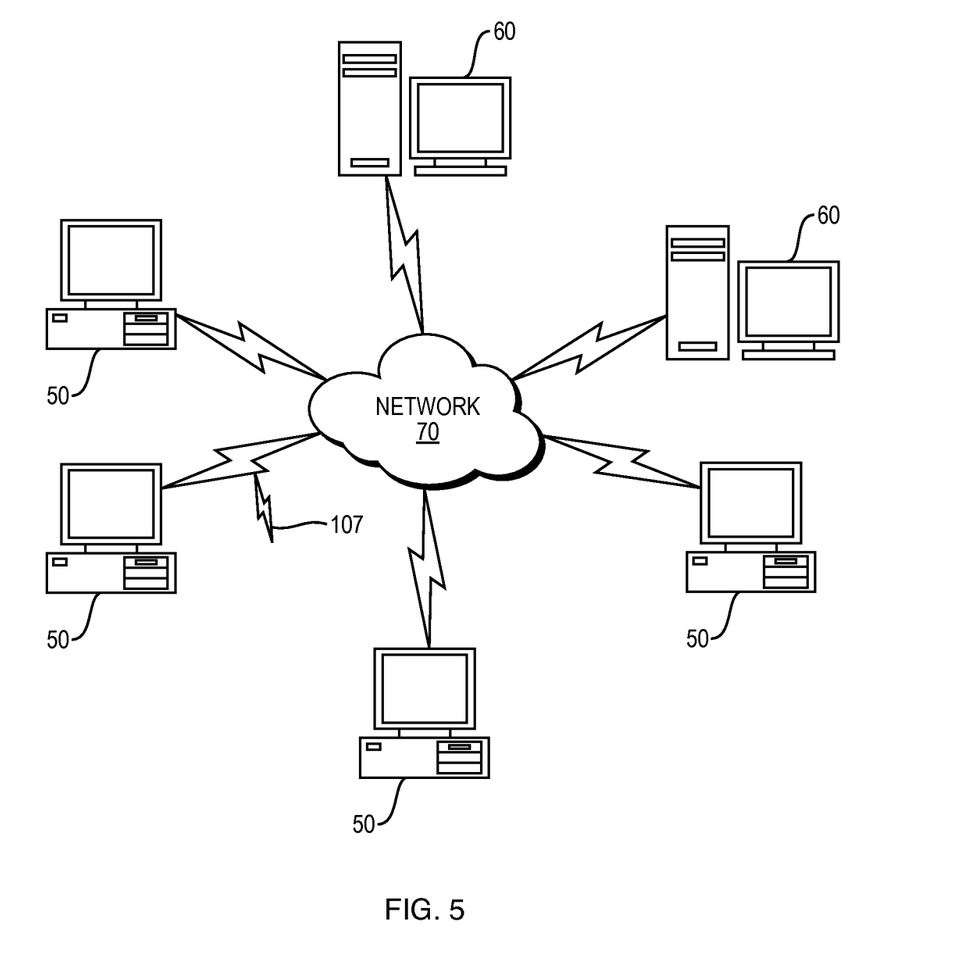
FIG. 5 is a network diagram that illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
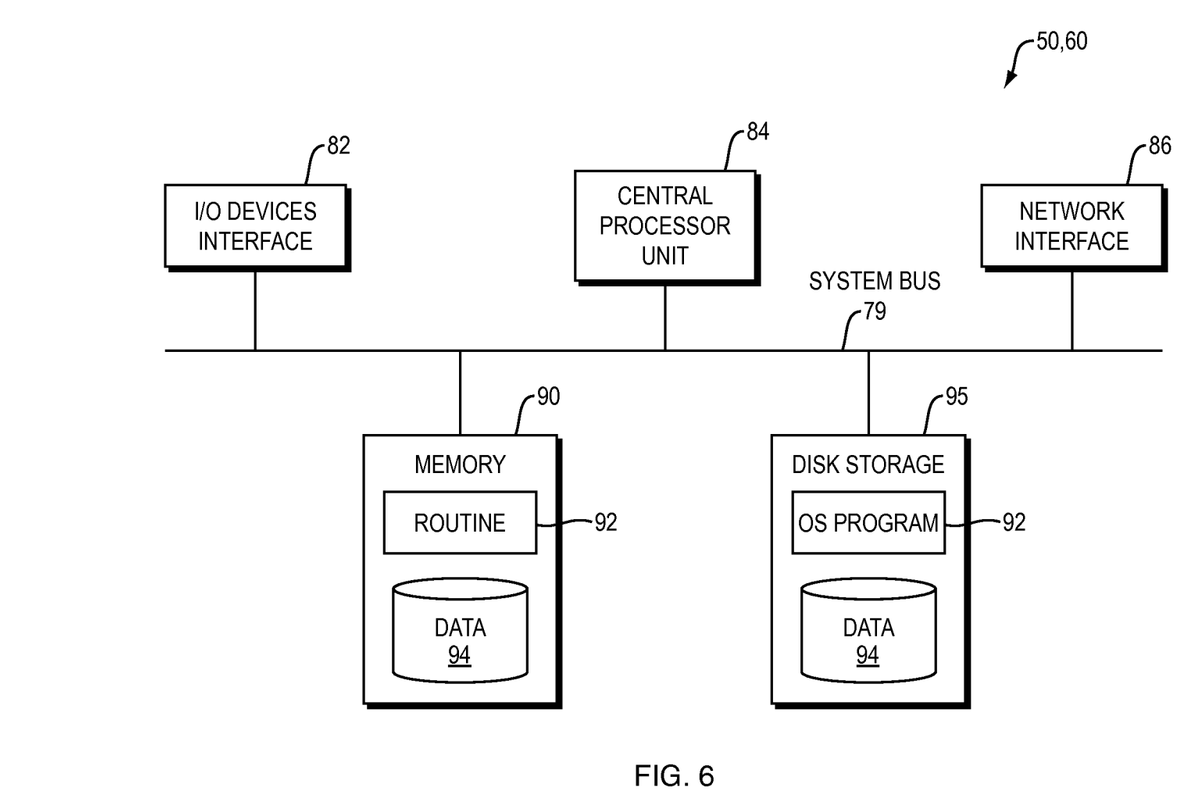
FIG. 6 is a block diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network.

In one embodiment, the propagated signal is a signal that is transmitted over the propagation medium over a period of time, such as the instructions for a software application sent in packets over a network over a period of milliseconds, seconds, minutes, or longer.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method:
building, by a processor, an ontology of grammar models for performing natural language understanding (NLU) processing by an NLU system by:
receiving, from an annotating user via a user interface, electronically formatted manually-generated annotations of intents and mentions of a set of sentences that are displayed via the user interface to the annotating user;
comparing the manually-generated annotations of the intents and the mentions of the set of sentences against multiple machine-generated annotations, each of the machine-generated annotations being generated using a grammar model from among multiple grammar models, the comparing being as a function of each grammar model among the multiple grammar models stored in a memory, the machine-generated annotations corresponding to intents and mentions of the set of sentences, each of the multiple grammar models being a grammar model having a plurality of stub grammar models, and wherein the grammar model correlates an input of a given user to a response to the given user;
computing a respective inter-sentence score for each respective grammar model based on respective intra-sentence scores of intents and mentions of each machine-generated annotation for the respective grammar model compared to the intents and mentions of the manually-generated annotations, the respective score being a match of each machine-generated annotation for the respective grammar model to each manually-generated annotation; and
providing, via the user interface, a list of recommended grammar models of the multiple grammar models to employ based on the scores corresponding to the machine-generated annotations corresponding to the respective grammar model, the list including grammar models scoring above a particular semantic confidence threshold;
receiving selection, from the annotating user via the user interface, of a grammar model of the recommended grammar models; and
adding the user-selected grammar model of the list of recommended grammar models to the ontology of the NLU system.

2. The method of claim 1, further comprising parsing, by the machine, each of the set of sentences to generate the machine-generated annotations.

3. The method of claim 1, further comprising adjusting weightings of the respective scores of the annotations having intents and mentions measurements related to an end user's experience.

4. The method of claim 1, wherein computing the scores to the machine-generated annotations further includes computing a plurality of scores.

5. The method of claim 4, wherein computing the scores to the machine-generated annotations further includes averaging the plurality of scores.

6. A system comprising:
a processor configured to implement building an ontology for performing natural language understanding (NLU) processing by an NLU system by:
a user input module configured to receive input, via a user interface, from an annotating user of electronically formatted manually-generated annotations of intents and mentions of a set of sentences that are displayed via the user interface to the annotating user;
a comparison module configured to compare the manually-generated annotations of the intents and the mentions of the set of sentences against multiple machine-generated annotations, each of the machine-generated annotations being generated using a grammar model from among multiple grammar models, the comparing being a function of each grammar model among the multiple grammar models stored in a memory, the machine-generated annotations corresponding to intents and mentions of the set of sentences, each of the multiple grammar models being a grammar model having a plurality of stub grammar models, and wherein the grammar model correlates an input of a given user to a response to the given user;
a scoring module configured to compute a respective intra-sentence score for each respective grammar model based on respective intra-sentence scores of intents and mentions of each machine-generated annotation for the respective grammar model compared to the intents and mentions of the manually-generated annotations, the respective score being a match of each machine-generated annotation for the respective grammar model to each manually-generated annotation; and
a recommendation module configured to:
provide, via a user interface, a list of recommended grammar models of the multiple grammar models to employ based on the scores corresponding to the machine-generated annotations corresponding to the respective grammar model, the list including grammar models scoring above a particular semantic confidence threshold,
receive a selection, from the annotating user via the user interface, of a grammar model of the recommended grammar model, and
adding the user-selected grammar model of the list of recommended grammar models to the ontology of the NLU system.

7. The system of claim 6, further comprising a parsing module configured to parse, by the machine, each of the set of sentences to generate the machine-generated annotations.

8. The system of claim 6, further comprising a weighting module configured to adjust weightings of the respective scores of the annotations having intents and mentions based on measurements related to an end user's experience.

9. The system of claim 6, wherein the scoring module is further configured to compute a plurality of scores.

10. The system of claim 9, wherein the scoring module is further configured to average the plurality of scores.

11. A non-transitory computer-readable medium configured to store instructions, the instructions, when loaded and executed by a processor, cause the processor to:
build an ontology for performing natural language understanding (NLU) processing by an NLU system by:
receiving inputs, via a user interface, from an annotating user of electronically formatted manually-generated annotations of intents and mentions of a set of sentences that are displayed via a user interface to the annotating user;

comparing the manually-generated annotations of the intents and the mentions of the set of sentences against multiple machine-generated annotations, each of the machine-generated annotations being generated using a grammar model from among multiple grammar models, the comparing being a function of each grammar model among the multiple grammar models stored in a memory, the machine-generated annotations corresponding to intents and mentions of the set of sentences, each of the multiple grammar models being a grammar model having a plurality of stub grammar models, and wherein the grammar model correlates an input of a given user to a response to the given user;

computing a respective intra-sentence score for each respective grammar model based on respective intra-sentence scores of intents and mentions of each machine-generated annotation for the respective grammar model compared to the intents and mentions of the manually-generated annotations, the respective score being a match of each machine-generated annotation for the respective grammar model to each manually-generated annotation; and providing, via the user interface, a list of recommended grammar models of the multiple grammar models to employ based on the scores corresponding to the machine-generated annotations corresponding to the respective grammar model, the list including grammar models scoring above a particular semantic confidence threshold;

receiving a selection, from the annotating user via the user interface, of a grammar model of the recommended grammar models; and adding the user-selected grammar model of the list of recommended grammar models the ontology of the NLU system.

12. The non-transitory computer-readable of claim 11, wherein the instructions further cause the processor to parse, by the machine, each of the set of sentences to generate the machine-generated annotations.

13. The non-transitory computer-readable of claim 11, wherein the instructions further cause the processor to adjust weightings of the respective scores of the annotations having intents and mentions based on measurements related to an end user's experience.

14. The non-transitory computer-readable of claim 11, wherein the instructions further cause the processor to compute the scores to the machine-generated annotations by computing a plurality of scores.

* * * * *